P. M. GUNDLACH.
Seed Drill.

No. 112,336.

3 Sheets—Sheet 1.

Patented Mar. 7, 1871.

Witnesses.

Inventor
P. M. Gundlach

P. M. GUNDLACH.
Seed Drill.
No. 112,336.
3 Sheets—Sheet 2.
Patented Mar. 7, 1871.
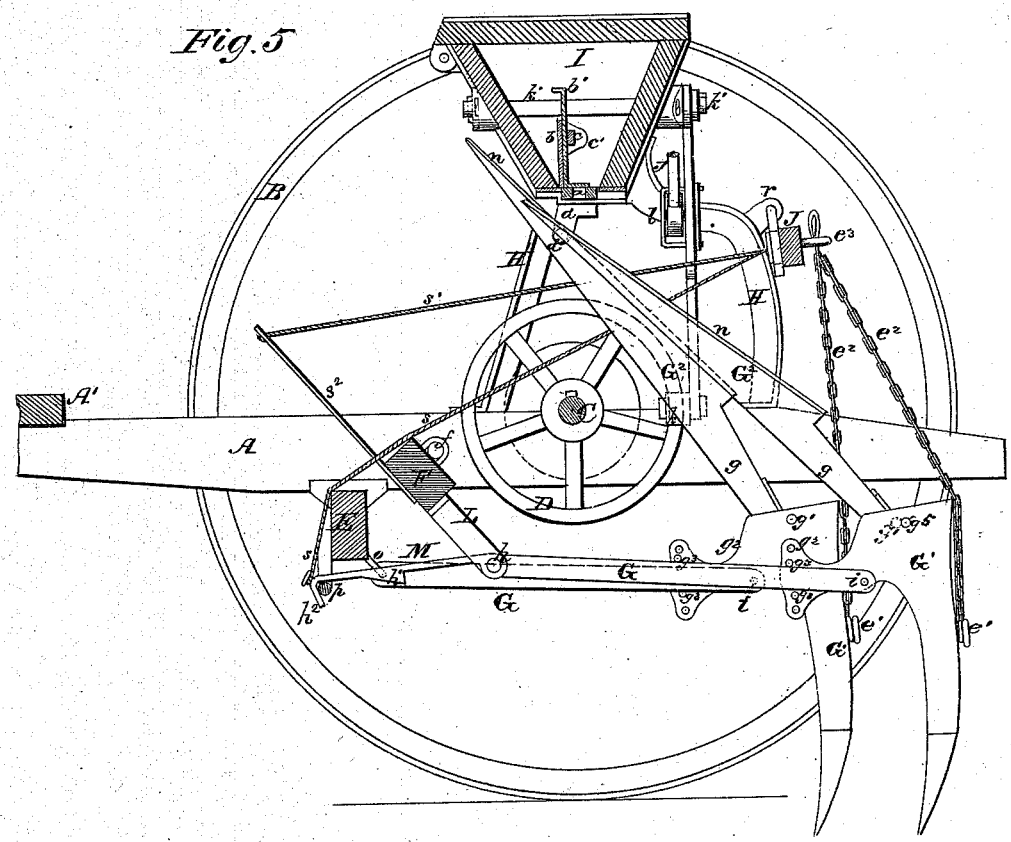
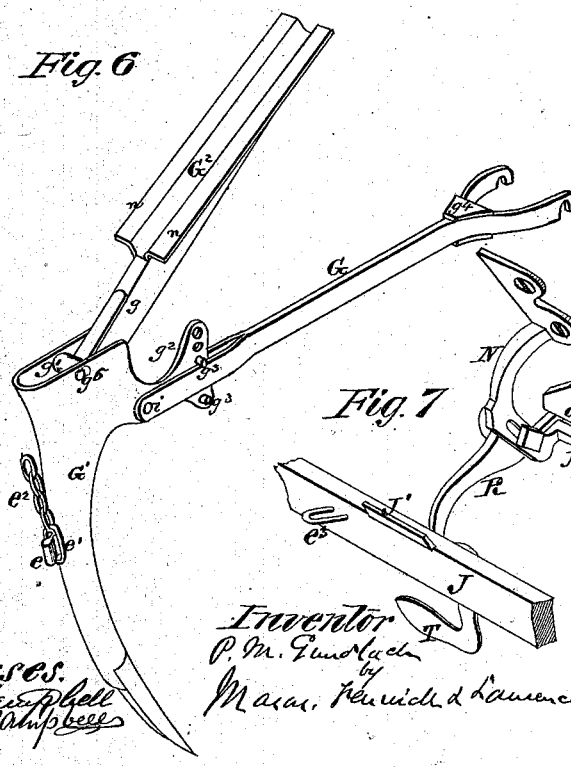
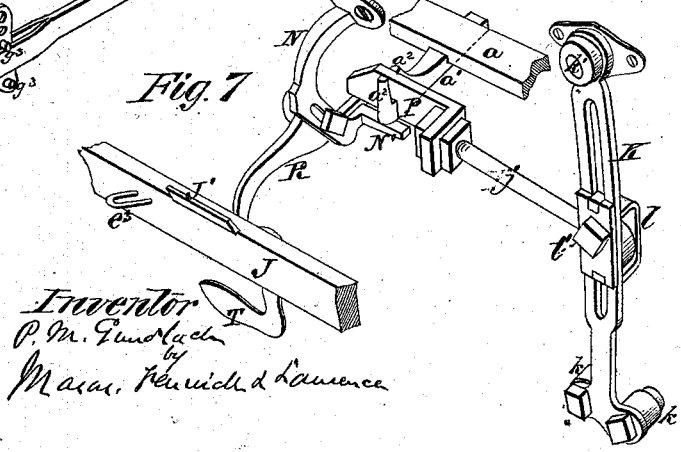

P. M. GUNDLACH.
Seed Drill.

No. 112,336.

3 Sheets—Sheet 3.

Patented Mar. 7, 1871.

Witnesses:
R. Campbell
J. N. Campbell

Inventor
P. M. Gundlach
by
Mason, Fenwick & Lawrence

UNITED STATES PATENT OFFICE.

PHILIP M. GUNDLACH, OF BELLEVILLE, ILLINOIS.

IMPROVEMENT IN SEEDING-MACHINES.

Specification forming part of Letters Patent No. 112,336, dated March 7, 1871.

*To all whom it may concern:*

Be it known that I, PHILIP M. GUNDLACH, of Belleville, in the county of St. Clair and State of Illinois, have invented certain new and useful Improvements on Seeding-Machines; and I do hereby declare that the following is a full, clear, and exact description thereof, reference being had to the accompanying drawings, making part of this specification, in which—

Figure 1:
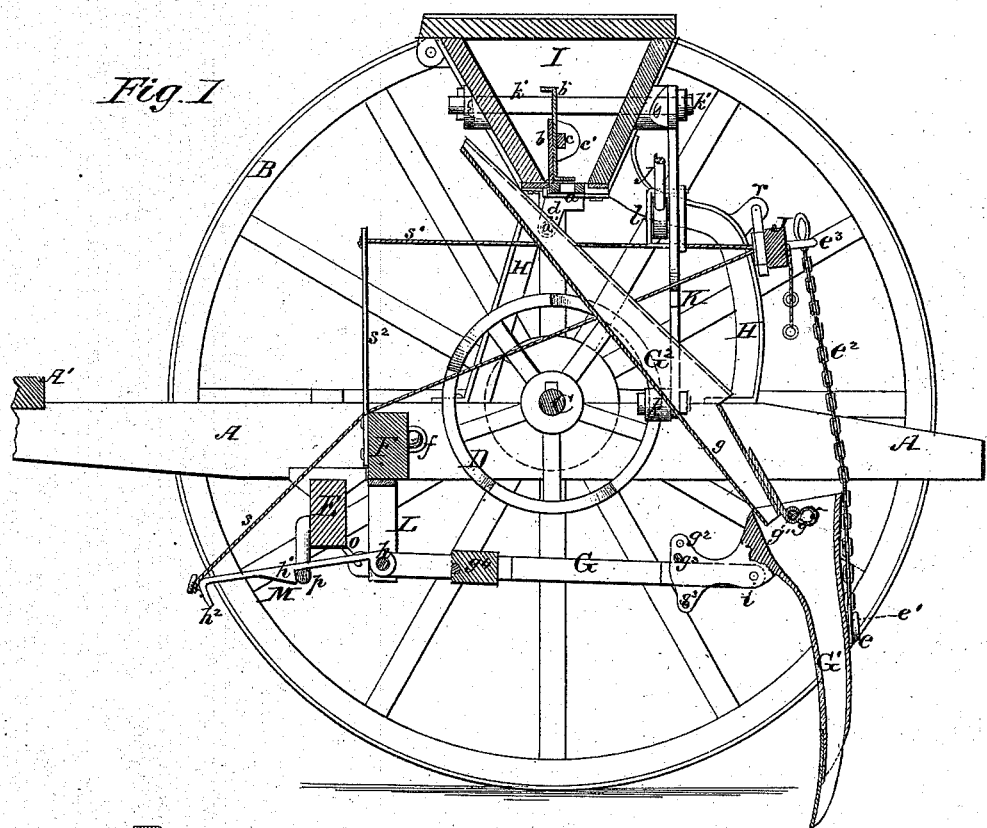
Figure 3:
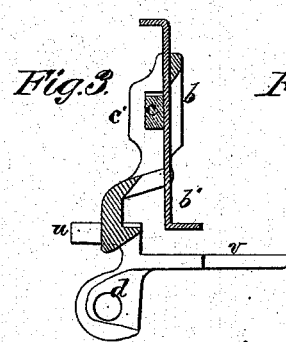
Figure 2:
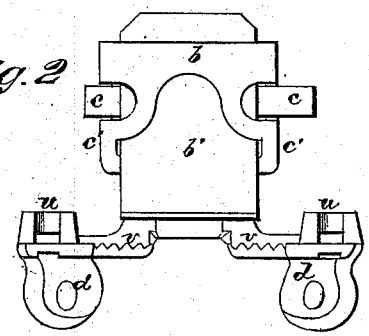
Figure 4:
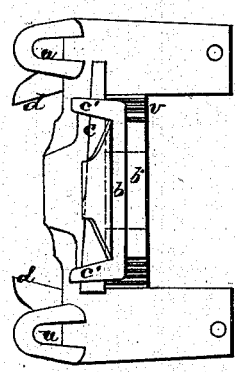
Figure 8:
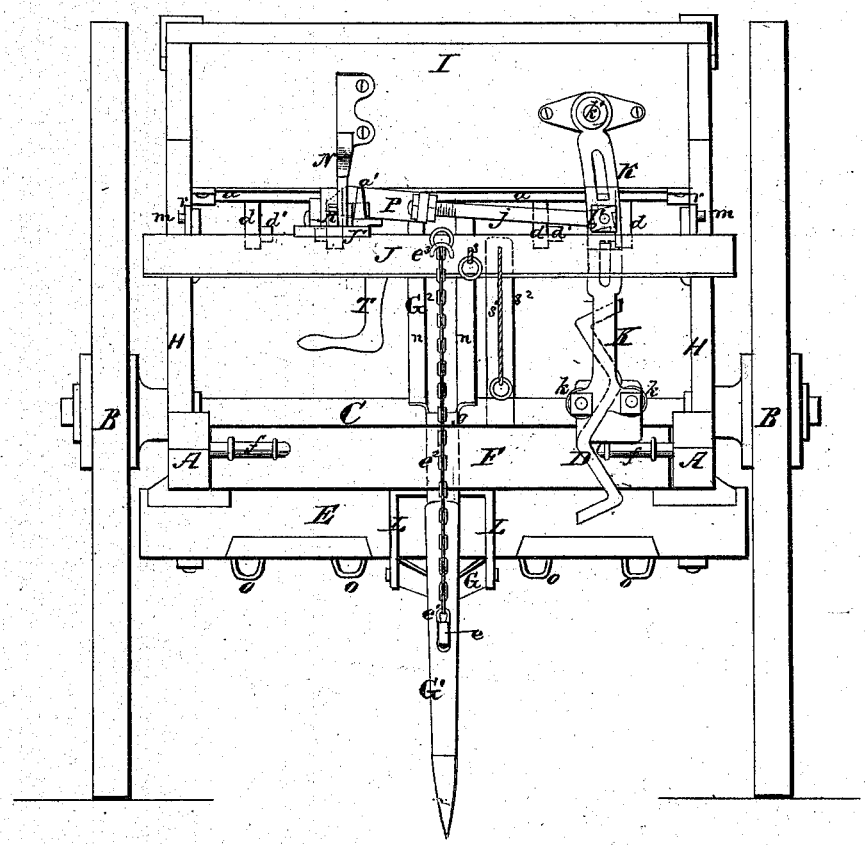

Figure 1, Plate 1, is a section through the improved machine, taken longitudinally and vertically, showing the relative position of the parts when the drill-hoes are all in the same rank. Figs. 2, 3, and 4, Plate 1, are different views, showing the construction of the seed-distributing devices which are applied into the hopper. Fig. 5, Plate 2, is a vertical longitudinal section through the machine, showing the relative position of the parts when the drill-hoes are arranged in two ranks. Fig. 6, Plate 2, is a perspective view of one of the hoes, its drag-bar, and seed-conveyer. Fig. 7, Plate 2, is a perspective view of certain devices for moving the seed-slide, and also for detaching the operating mechanism from said slide when the hoes are all raised free from the ground. Fig. 8, Plate 3, is an elevation of the rear end of the machine with all of the hoes but one removed.

Similar letters of reference indicate corresponding parts in the several figures.

This invention relates to seeding-machines which are designed for sowing grain in drills.

The invention consists, first, in a new and improved mode of attaching the drag-bars of the drill-hoes to the frame of the machine, whereby the hoes can be changed from double to single ranks or from single to double ranks while the machine is in motion, said mode consisting in pivoting the drag-bars of alternate hoes to a stationary cross-beam and in pivoting the drag-bars of the other hoes to bearings which depend from a rocking cross-bar, and in combining with the pivotal connections of the longitudinally-adjustable drag-bars hooking or latching devices, which will hold said bars, with their hoes, either in a forward or a backward position, as will be hereinafter explained; second, in providing for adjusting the longitudinally-movable drill-hoes forward or backward from the rear of the machine by means of ropes or chains, one of which is connected to an arm rising from the said rocking bar, while other ropes or chains are connected to the above-mentioned latching devices, as will be hereinafter explained; third, the employment of grain-conductors for conveying the grain from the hopper into the upper ends of the drill-hoes, said conductors consisting of flanged troughs, which are pivoted behind to the hoes and supported by their flanges beneath the hopper upon pins or rollers, as will be hereinafter explained; fourth, it consists in the serrated or roughened surfaces on the plate beneath the valve or cut-off, over which surfaces the seed-slide moves, whereby the grain is prevented from escaping from the hoppers except when discharged by the movement of the said slide, as will be hereinafter described; fifth, it consists in making a cylindric socket in the inner side of one of the cheeks of the seed-drill tube and an oblong socket in the inner side of the other cheek of the drill-tube, in combination with a hole extending entirely through one of the cheeks and terminating in the aforesaid oblong socket, whereby the pivot which fastens the grain-conductor to the tube can be connected to the tube, and by the insertion of a removable pin or key will be confined in place without the necessity of riveting or using screw and nut, and whereby also, the drill-tube and conductor can be very readily disconnected from each other and again connected, as occasion may require; sixth, in constructing the guides for the seed-slide with portions of their upper surfaces serrated or roughened for the purpose of preventing seed from flowing out of the hopper too freely or when the seed-slide is stationary, as will be hereinafter explained.

To enable others skilled in the art to understand my invention, I will explain its construction and operation.

The frame of the machine consists of two longitudinal beams, A A, connected together and suitably braced. This frame is sustained by an axle, C, of two transporting-wheels, B B, on which axle is keyed a circular serpentine or zigzag cam, D. Upon end standards, H, which rise from the beams A A, the hopper F is supported, which hopper is provided with a hinged cover, also with a seed-slide, a, through which rectangular oblong holes are made for the escape of the seed.

In front of the transverse axle C and secured rigidly to the bottom edges of the frame-beams A A is a beam, E, which extends transversely beneath said beams, and has pairs of loops O O secured to its lower back edge, to which one set of the drag-bars G are pivoted. Just in rear of the cross-beam E is another cross-beam, F, which is pivoted at $f\,f$ to the beams A A, so as to rock forward and backward. To this rocking beam F hangers or bearings L are secured, so as to occupy spaces between the pairs of loops O O. To the bearings the other set of drag-bars G are pivoted at $h$.

To the rear ends of the drag-bars G the drill-hoes G' are connected by pivots at $i$, so that when the rocking beam F is in the position indicated in Fig. 1 all the hoes will be in the same rank transversely; but when the beam F is released from loops $p$, as will be hereinafter explained, the set of hoes and drag-bars which are pivoted to the bearings L will recede and form a rank in rear of the hoes whose bars are attached to the stationary beam E, as shown in Fig. 5.

To the pivot-pin $h$ of each longitudinally-adjustable drag-bar G a catching device, M, is pivoted, having two catches, $h'\,h^2$, on its bottom side. This catching device passes through a loop, $p$, fastened to the fixed beam E, and will hold its drag-bar and hoe either in a forward or a backward position. By means of a rope or chain, $s$, which extends backward and passes through a rocking beam, J, and which has a ring on its rear end, an attendant in rear of the hopper I can raise the catching device M free from its retaining loop $p$, and in this way detach the catch $h'$ from this loop when it is desired to form two ranks of hoes.

Rising perpendicularly from the rocking beam F is an arm, $s^2$, to the upper end of which a rope or chain, $s'$, is fastened, which is carried backward and passed through the beam J. By means of this arrangement a person in rear of the machine can draw forward the longitudinally-movable hoes into the same rank with the other hoes, when the catching device M will retain them in this position, as shown in Fig. 1.

Each one of the hoes G' is a tubular casting, presenting at its upper end an oblong opening, and terminating below in a somewhat reduced circular opening. Each hoe is curved, as shown in the drawings, and has a point secured to it for drilling. From the front of the upper portion of each hoe is a projection, $g^2$, which is perforated, and which receives through its perforations wooden pins $g^3\,g^3$, above and below the drag-bar G, which latter is pivoted at $i$ in rear of said pins. Wooden pins $g^3\,g^3$ are employed for the purpose of allowing the hoes to give way, should their points become engaged with any obstruction which would be liable to injure the machine. By means of supplemental hoes through the projection $g^2$ of each hoe, the pins $g^3\,g^3$ can be adjusted so as to regulate the angle of the hoe. Each hoe has a button, $e'$, cast on its rear part at a suitable distance below its upper end, about the neck of which a link, $e'$, is compressed, to which a chain, $e^2$, is attached. This chain extends up through an eye, $e^3$, and has a ring attached to its upper end. In this way the drill-hoes are all attached to or suspended from the rocking bar J, and can be lifted free from the ground by taking hold of handle T and turning up the said bar, so that it will lie upon the upper portions of the rear standards, H.

To each hoe G a grain-conductor, $G^2$, is pivoted at $g'$, the pivot being confined by a removable key, $g^5$. This conductor consists of a lower tubular portion, $g$, and an open upper portion, which is flanged at $n\,n$, and tapered. The flanges $n\,n$ are supported upon the pins or rollers $d'\,d'$ of bearings $d\,d$, so that as the hoes rise and descend, the conductor will accommodate itself thereto, and at all times maintain the same position beneath the hopper. By means of the conductors the grain is conveyed directly into the upper ends of their respective drill-hoes in straight lines.

The suspension-beam J has a plate, J', fastened to it in such relation to the long and curved arm of a lever, R, that when this beam is turned up and the hoes raised free from the ground, the plate J' will strike and depress said lever-arm. This lever R is adjustably pivoted to a bracket, N, which is secured to the back of the hopper I, and which is constructed with a lateral extension, N'. (Shown in Fig. 7.) Upon the extension N' of bracket N the bifurcated rear end of a piece, $a'$, is supported, which piece is rigidly secured to the bottom of the seed-slide $a$.

Between the bifurcations $a^2\,a^2$ of the piece $a'$ a latch, P, engages, which latch is applied to the screw-threaded end of a pitman, $j$, and held fast by jam-nuts. This pitman $j$ is pivoted at $l'$ to an adjustable box, $l$, which is fastened to a vibrating slotted arm, K. Arm K is pivoted to the rear end of a pin, $k'$, which passes transversely through the hopper I, and to the lower end of this arm K anti-friction rollers $k\,k$ are applied, which receive between them the zigzag rim of cam D. The latch P is notched and engages with the piece $a'$, so that the vibrating movements imparted to arm K by cam D will transmit a rectilinear reciprocating motion to the seed-slide. When the beam J is thrown up and the hoes lifted from the ground thereby, the plate J' will depress lever R, and thus raise the pitman-latch P, so as to stop the motion of the seed-slide. When the beam J is turned over backward and the hoes depressed again, the latch P will engage with the piece $a'$ and the seed-slide will be operated. To regulate the flow of the seed from the hopper, the outer end of pitman $j$ is pivoted to a box, $l$, which is secured to arm K by a bolt passed through the slot through this arm. Thus by loosening said bolt, the box $l$ can be adjusted up or down, and the strokes given to the seed-slide can be shortened or lengthened.

In Figs 2, 3, and 4 I have represented different views of a seed distributer and regulator which is employed in the hopper I at each oblong seed-passage through the seed-slide $a$, The novelty of this device consists in the transverse serrations $v$ on the upper surfaces of the two lips over which the seed-slide moves. Between these two serrated lips is the passage for the escape of the seed, and above this passage is a vertically-adjustable valve-plate, $b'$, which is confined to the vertical portion $b$ of the casting by means of a wedge, $c$, which is driven through eyes $c'$ $c'$. Each casting is secured fast to the bottom of the hopper with its standard portion $b$ curving around the edge of the seed-slide and rising perpendicularly over the same.

Having described my invention, what I claim as new, and desire to secure by Letters Patent, is—

1. The hooking or latching devices M, pivoted to the rocking-beam bearings L of the longitudinally-shifting hoes, and applied to loops $p$ on the stationary beam E, substantially as and for the purposes described.

2. The rope or chains $s$ $s'$, connected, respectively, to the latching device M, and to an arm, $s^2$, rising from rocking beam F and extending back to the rear of the machine, substantially as described.

3. The grain-conductor $G^2$, pivoted directly or indirectly to the drill-hoes, and supported above upon pins or rollers $d'$ on bearings $d$, substantially as described.

4. The serrated or roughened surface $v$ on the plate beneath the valve or cut-off $b'$, over which surface the seed-slide moves, whereby the grain is prevented from escaping from the hopper except when discharged by the movements of seed-slide, substantially as described.

5. The combination of the pivot $g'$ and the removable pin or key $g^5$ with the drill-tube, all constructed substantially as described.

PHILIP M. GUNDLACH.

Witnesses:
 JAMES M. HAY,
 CHAS. P. KNISPEL,
 JOHN H. SIEFERT.